United States Patent
Gottwick

(10) Patent No.: US 7,824,787 B2
(45) Date of Patent: Nov. 2, 2010

(54) FUEL CELL SYSTEM WITH HYDROUS FLUID FLOW COMPENSATION

(75) Inventor: Ulrich Gottwick, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1001 days.

(21) Appl. No.: 11/195,243

(22) Filed: Aug. 2, 2005

(65) Prior Publication Data

US 2006/0086500 A1    Apr. 27, 2006

(30) Foreign Application Priority Data

Oct. 23, 2004    (DE) .................. 10 2004 051 751

(51) Int. Cl.
*H01M 2/02* (2006.01)
(52) U.S. Cl. .................. 429/34; 429/26; 429/38; 180/65.3
(58) Field of Classification Search .................. 429/34, 429/38, 39, 26; 180/65.3
See application file for complete search history.

(56) References Cited

U.S. PATENT DOCUMENTS

| | | | | |
|---|---|---|---|---|
| 4,532,192 A | * | 7/1985 | Baker et al. | 429/19 |
| 2003/0232226 A1 | * | 12/2003 | Morishima et al. | 429/24 |
| 2004/0262167 A1 | * | 12/2004 | Burch et al. | 205/637 |
| 2005/0233182 A1 | * | 10/2005 | Fuss et al. | 429/12 |
| 2009/0136799 A1 | * | 5/2009 | Duebel et al. | 429/17 |

* cited by examiner

*Primary Examiner*—Raymond Alejandro
(74) *Attorney, Agent, or Firm*—Michael J. Striker

(57) ABSTRACT

A fuel cell system has a fuel cell with a cathode and an anode and constructed so that a hydrous fluid in a form of a cathode exhaust gas flows out of the cathode of the fuel cell unit. A conditioning unit is included to condition the hydrous fluid cathode exhaust gas flow upon exiting the cathode.

11 Claims, 1 Drawing Sheet

FUEL CELL SYSTEM WITH HYDROUS FLUID FLOW COMPENSATION

BACKGROUND OF THE INVENTION

The present invention relates to a fuel cell system with a fuel cell unit.

With regard for future vehicles—which can be assumed to mean passenger cars and trucks, in particular—the fuel cell drives, either with or without upstream reformation, will attain a relatively high level of significance. Demonstration models are already in use.

In practical applications it has been shown, however, that, especially at cold external temperatures, the relative cold exhaust gasses—containing water vapor—from the fuel cell system produce plumes of steam, which are disadvantageous.

SUMMARY OF THE INVENTION

Accordingly, it is an object of the present invention to provide a fuel cell system with a fuel cell unit, which eliminates the disadvantages of the prior art.

More particularly, it is an object of the present invention is to provide a fuel cell system, whereby a hydrous fluid flow flows out of at least a cathode or an anode, whereby the exhaust gasses are effectively prevented from turning into steam.

In keeping with these objects and with others which will become apparent hereinafter, one feature of the present invention resides, briefly stated, in a fuel cell system, comprising a fuel cell having a cathode and an anode and formed so that a hydrous fluid flows out of at least one of said cathode and said anode of said fuel cell unit; and a conditioning unit provided for conditioning the hydrous fluid flow.

Accordingly, a fuel cell system according to the present invention is unique in that a conditioning unit is provided to condition the hydrous fluid flow. With the aid of the conditioning unit according to the present invention, the moisture in the exhaust gas, in particular the cathode exhaust gas flow, is controllable and/or adjustable in an advantageous manner. For example, the moisture in the fluid flow can be adjusted such that steam does not form during and/or after the fluid flow exits the fuel cell system and the vehicle and/or enters the surroundings. In an advantageous embodiment of the present invention, an electronic control unit is provided for controlling the conditioning unit.

Advantageously, the conditioning unit includes at least one heating unit for heating the hydrous fluid flow. With this, an increase in the temperature of the hydrous fluid flow is realizable in an advantageous manner, so that the fluid flow has a temperature—in particular when it enters the surroundings—that is higher than the dew point of the fluid flow. The temperature of the fluid flow is preferably approximately 5°, 10°, 15° C. or more above the dew point temperature of the fluid flow. Due to the temperature increase or heating of the cathode exhaust gasses or the fluid flow, the water vapor in the gasses does not condense, since a dilution of the exhaust gasses or the fluid flow with the ambient air after exiting the fuel cell system or the exhaust pipe is advantageously so great that condensation is effectively prevented. As a result, the dew point temperature constantly remains below the fluid flow temperature, so that water does not condense out and steam does not form. In a particular further development of the present invention, the heating unit includes an electrical heating device for heating the hydrous fluid flow.

As an alternative thereto or in combination therewith, to heat the fluid flow, the system temperature and/or the operating temperature of the fuel cell unit can be increased in an advantageous manner, in particular using control technology-based measures, so that the distance and/or difference of the temperature of the fluid flow and/or exhaust gas from the dew point temperature is sufficiently great and/or is as great as possible.

The fuel cell unit requires a certain amount of oxygen to convert the fuel. If the amount of available oxygen corresponds exactly to the amount required for the chemical reaction, the excess-air factor "lambda" is equal to one. When lambda is equal to two, for example, there is twice as much oxygen available as is necessary.

Advantageously, the dew point and/or the dew point temperature of the hydrous fluid flow can be changed by varying the lambda air value of the fuel cell unit such that the distance and/or the difference between the dew point temperature and the exhaust-gas temperature and/or fluid-flow temperature is increased in an advantageous manner. This measure and the measure stated above are also referred to as "pretreatment". When the lambda value rises, dilution of the exhaust gas is achieved. As a result, the exhaust gas becomes dryer, due to the fact that the water produced via combustion is integrated in a greater overall volumetric flow. At the same time, the dew point temperature of the overall volumetric flow is lowered. As a result, the distance between the dew point temperature and the exhaust-gas temperature and/or fluid-flow temperature is increased accordingly in the manner described above.

By comparison, the increase in temperature of the hydrous fluid flow using the heating unit is referred to as "after-treatment". As a further possibility for after-treatment, the conditioning unit can advantageously have at least one cooling unit for cooling the fluid flow. For example, the hydrous fluid flow is cooled with the aid of the cooling unit such that the water is condensed out of the fluid flow. Preferably, the cooled fluid flow is subsequently cooled. Ambient air or the like can be used to achieve this, for example. The heating unit according to the present invention is preferably used for this purpose. With this method, it is an advantage that relatively little heat energy need be used, since a portion of the water in the fluid flow was removed from the fluid flow when heating took place. If necessary, the fuel cell system and/or a corresponding vehicle already has an advantageous cooling unit, e.g., for air-conditioning the interior of the vehicle, so that it can perform a plurality of functions, and no additional components are required to implement the present invention.

In addition, a component is so cold during a start-up phase of the fuel cell system and/or the vehicle in particular that this component is capable of being used as a cooling unit for condensing the water out of the fluid flow.

As a further possibility for after-treatment, it is feasible that the condensation unit includes at least one supply device for supplying a second fluid flow to the hydrous fluid flow of the cathode. The amount of moisture in the second fluid flow is preferably less than the amount of moisture in the fluid flow of the cathode. This measure can also be used to prevent discharged exhaust gasses from turning into steam.

Generally speaking, it is advantageous to dry the hydrous fluid flow.

In a particular further development of the present invention, the condensing unit includes at least one discharge device for diverting the water separated out of the hydrous fluid flow of the cathode. By diverting the water that has been separated out, it is possible to effectively prevent the exhaust system or the like from impairment or rusting.

Preferably, at least one water-storage device is provided for intermediate storage of the water that was separated out. With the aid of this measure, it is ensured that the intermediately-stored water separated out of the cathode fluid flow can be made available for other applications of the fuel cell system and/or the vehicle. For example, this water can be made available for the humidification of the educt flows of the fuel cell system and/or as windshield washing water or the like.

On the other hand, the intermediately-stored water that was separated out can be released to the surroundings in a controlled manner. For example, the water is not released to the surroundings while the vehicle is at idle, e.g., when waiting at a red light or the like, but preferably while driving. This ensures that ice will not form in winter at intersections with traffic lights due to released water.

Preferably, at least one temperature sensor is provided for determining a temperature of the ambient air and/or at least one of the fluid flows. The electronic control unit stated above contains the temperature sensor, for example. When the temperature of the ambient air and/or one of the fluid flows is known, the drying and/or heating, etc. can be carried out as a function of the measured temperature. When the corresponding temperatures are known, it is essentially possible to determine the dew point, so that the conditioning of the hydrous fluid flow can be carried out accordingly.

In an advantageous variant of the present invention, at least one moisture sensor is provided to determine the moisture of the ambient air and/or at least one of the fluid flows. With this measure it is possible to determine the dew point with particular accuracy, which markedly improves the controllability of the conditioning unit and/or the conditioning itself.

The conditioning unit is preferably operated as a function of at least the temperature and/or humidity of the ambient air. With this measure, the conditioning unit is prevented from being operated or switched on unnecessarily. This results in marked energy savings.

Advantageously, the conditioning unit is operated as a function of at least the dew point of the ambient air. As a result, a particularly advantageous adaptation of the operating mode of the conditioning unit is realizable.

In a particular further development of the present invention, the conditioning unit is operated at least during a start-up phase of the fuel cell system. In the start-up phase in particular, the exhaust gasses and/or fluid flows of the fuel cell system have a relatively low temperature, so their temperature may be equal to or lower than the dew point temperature, which can result in the formation of steam, which is a disadvantage. This is effectively prevented by starting-up the conditioning unit specifically during the start-up phase. If necessary, the use of a temperature sensor and/or a moisture sensor can be eliminated in this variant according to the present invention.

The conditioning unit according to the present invention may be operated as a function of the time of year. Steam is relatively likely to form during the cold season in particular. This can be effectively reduced via the advantageous operating mode of the conditioning unit.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
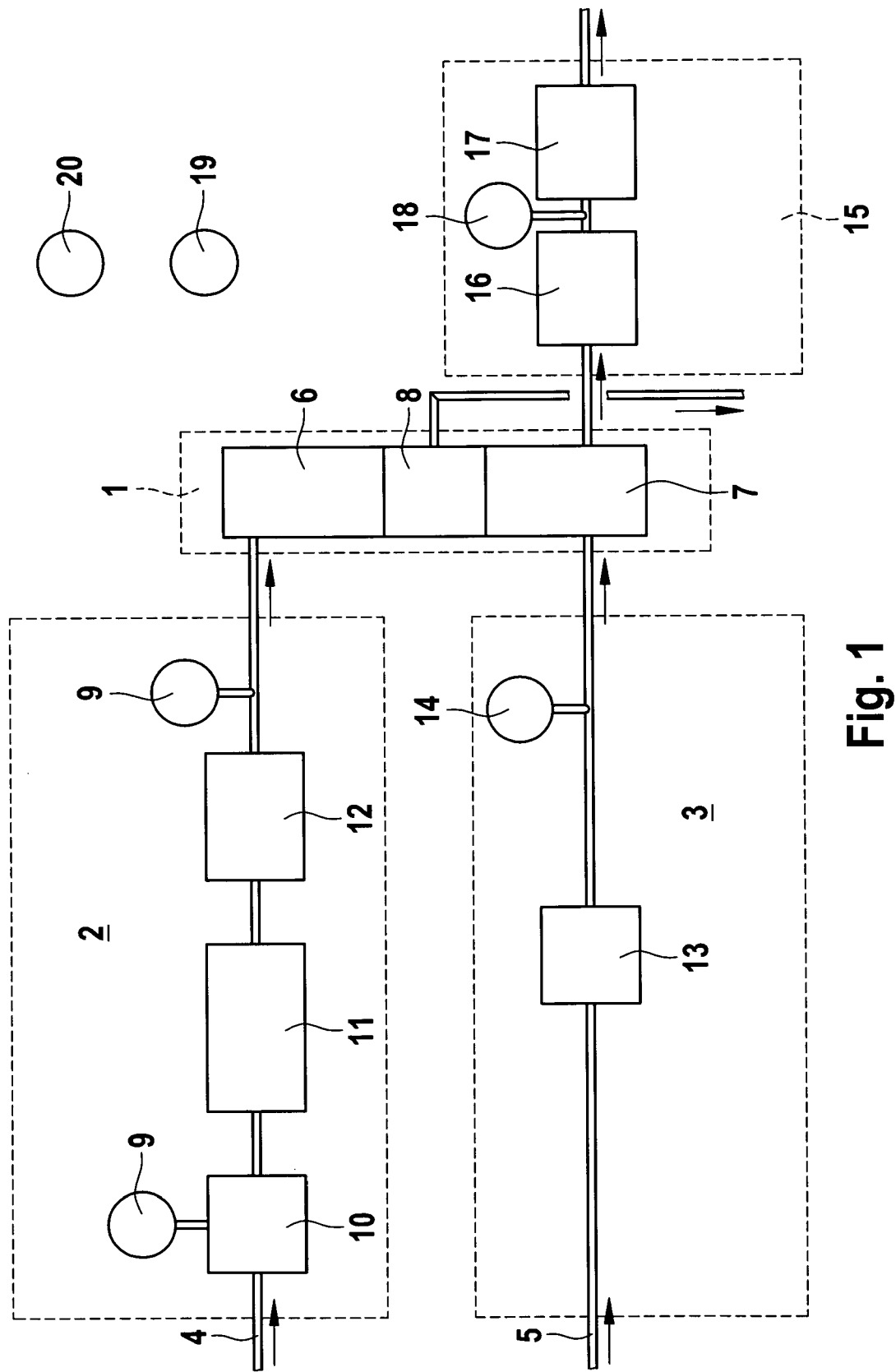
FIG. 1 is view showing a block diagram which schematically illustrates a fuel cell system in accordance with the present invention.

A fuel cell system includes a fuel cell 1, a fuel supply 2, and a oxidant supply and/or oxygen supply 3. Fuel 4 is supplied to an anode 6 of fuel cell 1 and oxygen 5 is supplied to a cathode 7 of fuel cell 1. Fuel cell 1 also has a membrane 8.

In the variant shown as an example, fuel supply 2 has a gas tank 10, a pressure reducer 11, a pressure regulating valve 12 and pressure sensors 9. Oxygen supply 3 also has a compressor 13, e.g., a fan or a supercharger, and a pressure sensor 14.

A conditioning unit according to the present invention is located downstream of cathode 7. The conditioning unit includes a pressure regulating valve 16 and exhaust-gas after-treatment 17, and an optional sensor 18 for measuring the temperature and/or humidity of the cathode outflow.

A control unit, which is not shown, evaluates the values determined by sensor 18 and monitors exhaust-gas after-treatment 17. The exhaust-gas after-treatment heats, e.g., the cathode flow in such a manner that, when the cathode flow enters the surroundings, it does not condense or form steam.

The control unit includes an optional temperature sensor 19 for detecting ambient temperature and/or a humidity sensor 20 for detecting the ambient humidity. With this, e.g., the operation of conditioning unit 15 can be matched to the ambient parameters.

For example, if heating the cathode exhaust gasses to a temperature at which the dew point of the exhaust gas is markedly below the exhaust-gas temperature, the water vapor no longer condenses in the exhaust gasses, in particular since dilution of the exhaust gasses with the ambient air after the exhaust gasses leave the exhaust pipe is sufficiently high. As a result, the dew point constantly remains below the outside temperature. Water does not condense out.

The temperature can be raised via re-warming using an electric heater 17 or the like (after-treatment). Likewise, the system temperature of fuel cell 1 can be raised by as much as possible (e.g., to approximately 90-95° C.), so that the distance from the dew point (e.g., approximately 80° C.) and exhaust-gas temperature is as great as possible (pretreatment). In addition, the dew point of the cathode exhaust gasses can be changed by varying the lambda air value such that the distance increases again (pretreatment).

Since exhaust-gas after-treatment requires a relatively high energy expenditure, the heating can take place mainly at correspondingly low outside temperatures, e.g., lower than approximately 5° C., and/or at high ambient humidities, e.g., greater than 80%, to a minimum extent. To this end, the temperature and, possibly also the humidity of the outside air can be detected using sensors 19, 20.

In addition, the after-treatment can be limited to start-up phases in which the temperature of the exhaust gasses is relatively close to the dew point. It is also possible for after-treatment to not be carried out at the lowest temperatures, either. It can be intentionally shut off, e.g., if the driver wants to release steam (for fun), or if he wants to drive in an energy-saving mode. It is also possible to realize a coloration of the outflowing exhaust gas or steam, which can increase driving fun in particular or can be used for display purposes. For example, it could be used to signal an impairment and/or failure or the like of a vehicle component, in particular of safety-relevant component and/or the fuel cell system or one of its parts. Signaling for these purposes is always an advantage with any type of vehicle.

In general, with the aid of the present invention, formation of condensate (formation of droplets, wetness underneath the vehicle, etc.) can be prevented by dissipating the cathode water in a gaseous state into the surroundings. It is also possible to prevent the formation of ice at cold points in the road where vehicles must often come to a standstill, e.g., as traffic lights, barriers, etc., or at points where vehicles typically lose water droplets, e.g., on uneven surfaces, changes in inclination, etc.

Generally speaking, the present invention can be used at least with fuel cells 1 for vehicle drives and/or as an "APU".

It will be understood that each of the elements described above, or two or more together, may also find a useful application in other types of constructions differing from the types described above.

While the invention has been illustrated and described as embodied in a fuel cell system with a hydrous fluid flow, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A fuel cell system, comprising a fuel cell unit having a cathode and an anode and formed so that a hydrous fluid in a form of a cathode exhaust gas flows out of said cathode of said fuel cell unit; and a conditioning unit located directly downstream of the cathode conditioning the hydrous fluid cathode exhaust gas flow including adjusting an amount of moisture in the hydrous fluid cathode exhaust gas flow, wherein said conditioning unit includes at least one heating unit heating the hydrous fluid cathode exhaust gas flow to prevent condensation of water vapor therein before discharging into environment, wherein said conditioning unit includes at least one discharge device diverting a water separated out of the hydrous fluid cathode exhaust gas flow flowing out of said cathode.

2. A fuel cell system as defined in claim 1, wherein said conditioning unit has at least one cooling unit cooling the hydrous fluid cathode exhaust gas flow.

3. A fuel cell system as defined in claim 1, and further comprising at least one water storage device provided for an intermediate storage of a water that was separated out.

4. A fuel cell system as defined in claim 1, and further comprising at least one temperature sensor operative for determining a temperature of a medium selected from the group consisting of an ambient air, the hydrous fluid cathode exhaust gas flow, and both.

5. A fuel cell system as defined in claim 1, and further comprising at least one moisture sensor operative for determining a moisture in at least one medium selected from the group consisting of an ambient air, the hydrous fluid cathode exhaust gas flow, and both.

6. A fuel cell system as defined in claim 1, wherein said conditioning unit is a unit operating as a function of at least one parameter selected from the group consisting of a temperature of an ambient air, a moisture of the ambient air, and both.

7. A fuel cell system as defined in claim 1, wherein said conditioning unit is formed as a unit operating as a function of at least a dew point of an ambient air.

8. A fuel cell system as defined in claim 1, wherein said conditioning unit is formed as a unit that operates at least during one start-up phase of the fuel cell system.

9. A fuel cell system, comprising:
a fuel cell unit having a cathode and an anode and formed so that a hydrous fluid in a form of a cathode exhaust gas flows out of said cathode of said fuel cell unit; and
a conditioning unit located directly downstream of the cathode conditioning the hydrous fluid cathode exhaust gas flow including adjusting an amount of moisture in the hydrous fluid cathode exhaust gas flow; wherein said conditioning unit includes at least one supply device supplying a second fluid flow to intermix with the hydrous fluid cathode exhaust gas flow flowing out of said cathode before discharging into environment, wherein said conditioning unit includes at least one discharge device diverting a water separated out of the hydrous fluid cathode exhaust gas flow flowing out of said cathode.

10. A fuel cell system as defined in claim 9, wherein said supply device is formed supplying the second fluid flow which contains an amount of moisture that is less that an amount of moisture in the hydrous fluid cathode exhaust gas flow flowing out of said cathode.

11. A vehicle, comprising:
a vehicle part, and
a fuel cell unit including a fuel cell having a cathode and an anode and formed so that a hydrous fluid in a form of a cathode exhaust gas flows out of said cathode of said fuel cell unit, and a conditioning unit located directly downstream of the cathode conditioning the hydrous fluid cathode exhaust gas flow including adjusting an amount of moisture in the hydrous fluid cathode exhaust gas flow, wherein said conditioning unit includes at least one supply device supplying a second fluid flow to intermix with the hydrous fluid cathode exhaust gas flow flowing out of said cathode before discharging into environment, wherein said conditioning unit includes at least one discharge device diverting a water separated out of the hydrous fluid cathode exhaust gas flow flowing out of said cathode.

* * * * *